United States Patent [19]

King

[11] 4,104,142
[45] Aug. 1, 1978

[54] SUSPENDED SOLIDS EXTRACTION SYSTEM AND METHOD

[76] Inventor: Arthur Shelley King, 8021 Cherokee La., Leawood, Kans. 66206

[21] Appl. No.: 791,337

[22] Filed: Apr. 27, 1977

Related U.S. Application Data

[62] Division of Ser. No. 713,251, Aug. 10, 1976.

[51] Int. Cl.² .................. C02B 1/82; C02C 5/12; B03C 5/00
[52] U.S. Cl. .................. 204/152; 204/149; 204/180 R; 210/44
[58] Field of Search .............. 204/180 R, 149, 152, 204/186, 130, 300 R; 210/44

[56] References Cited

U.S. PATENT DOCUMENTS

| | | | |
|---|---|---|---|
| 3,801,482 | 4/1974 | King | 204/149 X |
| 3,849,275 | 11/1974 | Candor | 204/180 R |
| 3,962,069 | 6/1976 | Inoue et al. | 204/300 R |
| 3,975,257 | 8/1976 | Hulse | 204/149 X |
| 4,001,100 | 1/1977 | Haydock | 204/180 R |

*Primary Examiner*—Arthur C. Prescott

*Attorney, Agent, or Firm*—Schmidt, Johnson, Hovey & Williams

[57] ABSTRACT

A liquid containing suspended solids is first passed through an electrostatic treater, having no current flow across its electrodes, to initiate nucleation and coagulation of the particles. Thereafter, it passes through an electrolytic treater wherein current may flow between the electrodes to further encourage coagulation to such an extent that flocculation begins. The residual effects of the electrostatic treater prevent plating out on the electrodes of the electrolytic treater such that electrolysis can occur without sacrificing an electrode, and the electrodes are so arranged that the liquid passes sequentially through groups of concentrated lines of force whose repetitious, powerful action further encourages flocculation. From the electrolytic treater, the liquid with its flocculated material is delivered into a clarifying basin so designed that the floc will settle out and be removed from the basin with a minimum of manipulation because of the tendency of such material to immediately dissipate and disperse when handled while still in the liquid.

5 Claims, 7 Drawing Figures

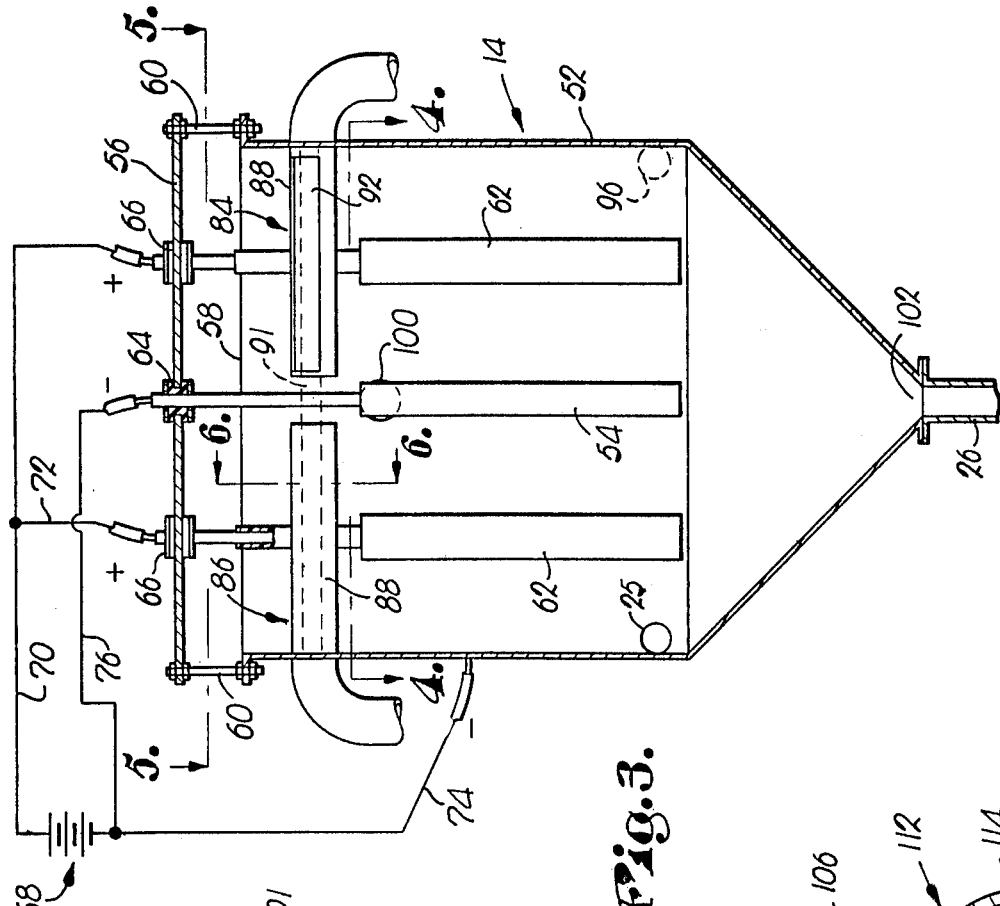
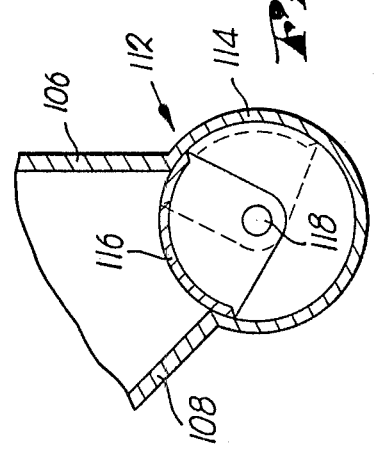
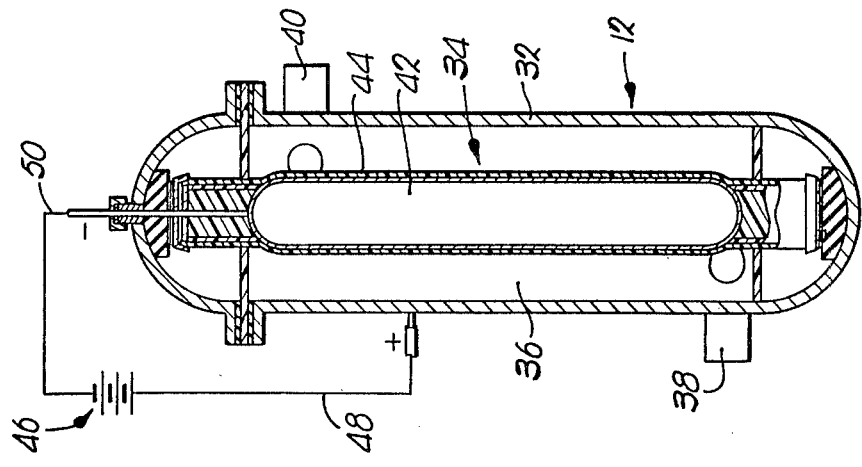

SUSPENDED SOLIDS EXTRACTION SYSTEM AND METHOD

This is a division of application Ser. No. 713,251, filed on Aug. 10, 1976.

This invention relates to the treatment of liquid suspensions by electricity to remove suspended solid material therefrom. In many respects, it is similar to the systems described and claimed in my prior U.S. Pat. No. 3,801,482, issued Apr. 2, 1974, and 3,871,989, issued Mar. 18, 1975.

As explained in those patents, I discovered that if a particle-laden liquid to be treated by electrolysis was first passed through an electrostatic treater in which no electrical current flow was permitted between electrodes, the residual effects of the electrostatic treater would prevent plating out on the electrodes of the electrolytic treater. Thus, using this technique, the powerful action of the electrolytic treater could be obtained without sacrificing either of its electrodes.

One important object of the present invention is to take this concept and apply it to a complete system which is capable of removing solids from a suspension to such an extent that the clarified liquid can then be sent through a number of fine filters, among other equipment, without fear of clogging such filters and causing the entire system to shut down for the laborious and time-consuming task of cleaning out the filters.

In one specific use of a system constructed in accordance with the principles of the present invention, at a dairy installation, it was found that a liquid suspension containing whole milk, cream, butterfat, yogurt and even such unrelated substances as soybean oil and human fecal matter could be removed from suspension, leaving a clarified liquid that could easily pass through carbon and sand filters of the community's sewage processing plant. Prior to the installation and use of my system, such solid wastes simply clogged up the filters, causing disruption of the entire sewage processing facility and casting considerable doubt on whether the dairy could continue to operate harmoniously within the community.

Another important object of the present invention is to provide an improved treater design, whether electrostatic or electrolytic, in which lines of force, instead of radiating outwardly from a central point in the manner of spokes of a wheel toward the cylindrical outer wall of the treater, are concentrated in a number of radially extending groups. Thus, although starting from a small diameter, center or inner electrode for the purpose of conserving space within the treater, the lines of force do not "fan" or "flare" out toward the outer wall of the chamber to the extent they would otherwise do. The lines of force are closely spaced apart and in fairly distinct groups such that the suspension may be circulated sequentially through the groups to receive their individual and repetitive effects.

An additional important object of this invention is to provide an improved clarifying basin and discharge outlet therefor which are so designed that physical manipulation of the flocculated solids achieved by the action of the electrostatic and electrolytic treaters is held to an absolute minimum to encourage rapid settling out and subsequent removal from the basin.

Yet another important object of this invention is to expedite such settling out of the floc by spraying electrostatically treated water onto the treated suspension in the clarifying basin.

In the drawings:

FIG. 2 is an enlarged, vertical cross-sectional view of an electrostatic treater used as a part of the system;

FIG. 3 is an enlarged, vertical cross-sectional view of the electrolytic treater used in conjunction with the system;

FIG. 6 is an enlarged, vertical cross-sectional view through one of the floc skimmers used in the electrolytic treater and taken along line 6—6 of FIG. 3; and FIG. 7 is an enlarged, fragmentary vertical cross-sectional view of the discharge outlet and associated valve of one of the clarifying basins.

Figure 1:
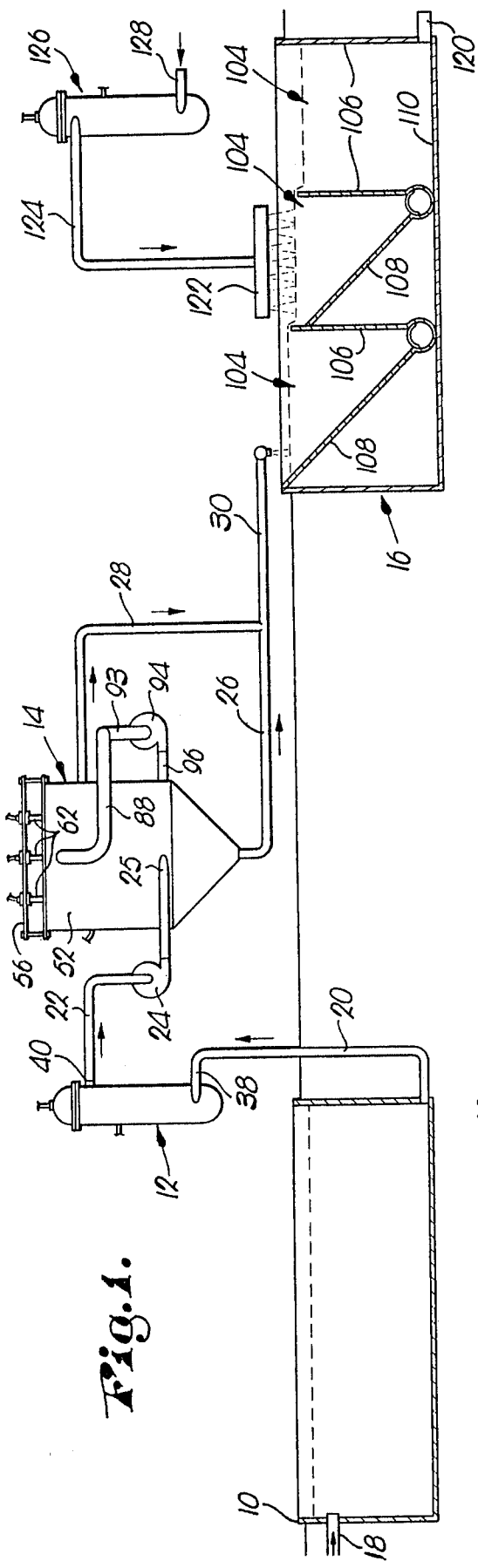
FIG. 1 is a diagrammatic view of a treating system constructed in accordance with the principles of the present invention.

As illustrated in FIG. 1, the system constructed in accordance with the present invention basically includes a reservoir 10 for receiving and holding a suspension to be treated, an electrostatic treater 12 coupled with the reservoir 10 downstream from the latter, an electrolytic treater 14 downstream from the electrostatic treater, and a clarifier 16 downstream from the electrolytic treater 14. An inlet 18 leads into the reservoir 10 for delivering the suspension into the latter, while a conduit 20 leads from the reservoir 10 adjacent the bottom thereof to the electrostatic treater 12. Preferably, the conduit 20 is controlled by a suitable valve (not shown). A conduit 22 leading from the upper end of the electrostatic treater 12 has a pump 24 therein for supplying suspension to the treater 14 somewhat adjacent the bottom thereof through a tangential inlet 25. Outlet conduits 26 and 28 from the bottom and upper portion of the treater 14, respectively, merge downstream from the latter into a single line 30 that delivers the electrically treated suspension into the clarifier 16.

The electrostatic treater 12 (detailed in FIG. 2) is preferably of the same type as illustrated in my aforesaid patents, basically comprising an outer metallic housing 32 having a cigar-shaped inner electrode 34 disposed concentrically within the same. Electrode 34 is spaced radially inwardly from the housing 32 such as to define an annular treating region 36 through which the suspension may pass. Tangential inlet and outlet 38 and 40, respectively, cause the suspension to swirl upwardly through the region 36 during the treating action.

The inner electrode 34 has a metallic internal, hollow conductor 42 provided with a jacket 44 of a suitable dielectric material such as Teflon. Accordingly, when the housing 32 and the inner electrode 34 are connected across a source 46 of direct potential, they become charged, but there is no electrical current flow across the region 36. Suitable leads 48 and 50 establish the electrical connection of electrode 34 and housing 32 across source 46.

The electrolytic treater 14 differs in construction from its counterparts in my aforesaid patents, although the result of causing electrolysis remains the same. The specific electrode configuration of the treater 14 serves to concentrate the lines of force into a series of radially extending, but circumferentially spaced groups within the treater 14.

In this respect the treater 14 has an outer, hollow, cylindrical electrode in the form of a metal container 52. A cylindrical carbon electrode 54 is suspended coaxially within the container 52 by a cover plate 56 supported above the open top 58 of the container 52 by peripheral posts 60. A number of intermediate, cylindrical carbon electrodes 62 are also suspended from the plate 56 into the container 52 and are arranged in a circular pattern about and in concentric relationship with the inner electrode 54.

The intermediate electrodes 62 are slightly larger in diameter than the inner electrode 54 and are equally circumferentially spaced about the latter. The intermediate electrodes 62 are slightly closer to the container 52 than to the inner electrode 54 as best illustrated in FIG. 4.

Suitable insulators 64 and 66, respectively, attach the inner electrode 54 and the intermediate electrodes 62 to the cover plate 56. The intermediate electrodes 62 are connected to one side of a source 68 of direct electrical potential by leads 70 and 72 for positive charging of the electrodes 62, while the container 52 and the inner electrode 54 are connected to the opposite side of the source 68 by leads 74 and 76 for negative charging thereof. Consequently, lines of force 78 and 80 are created as illustrated in FIG. 4 within the container 52 when the system is energized.

The force lines 78 extend between the inner electrode 54 and the intermediate electrodes 62, while the force lines 80 extend between the intermediate electrodes 62 and the container 52. Note that such force lines 78, 80 are arranged in fairly distinct groups 82 which are circumferentially spaced around the container 52 in accordance with the number of intermediate electrodes 62 utilized. In the illustrated example, four of such groups 82 are presented, each of the groups 82 having concentrated, closely spaced lines of force 78 and 80 which intersect the curved surfaces of the electrodes 52, 54 and 62 in perpendicular relationship to a tangent line at the point of intersection. The natural tendency for such force lines, because of their requirement of perpendicular intersection with electrode surfaces, is to flare or balloon outwardly into a dispersed condition. Thus, if the intermediate electrodes 62 of the treater 14 were eliminated and the inner electrode 54 charged differently than the container 52, the lines of force emanating from inner electrode 54 would be arranged in a spoke-like pattern in which the points of intersection along the container 52 would be more greatly spaced than the points of intersection along the inner electrode 54.

Figure 4:
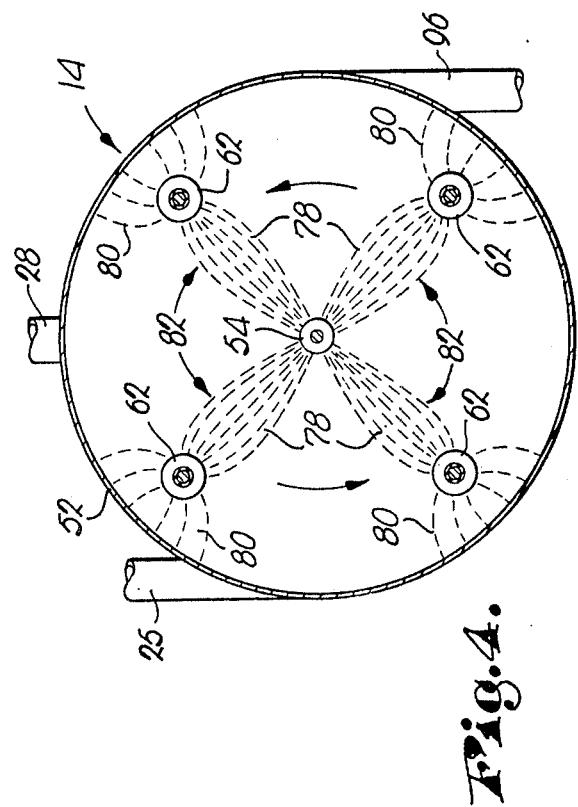
FIG. 4 is a horizontal, cross-sectional view thereof taken along line 4—4 of FIG. 3 illustrating the concentrated lines of force which are established by virtue of the special electrode orientation in the electrolytic treater.

However, by arranging the electrodes 52, 54 and 62 in the illustrated manner, and by charging them as described, the force lines are "warped" such as to become concentrated into a pattern as illustrated in FIG. 4. Consequently, the intersection points of the force lines 80 along the container 52 are much more closely spaced than would otherwise be the case. Further, the spacing of the force lines 78 is much closer at a given radial distance from inner electrode 54 than would be the case without the intermediate electrodes 62. The effect, therefore, is to present a number of intense groups 82 of concentrated force lines to which the suspension is subjected, and this encourages the solids which have initiated coagulation in the treater 12 to coagulate on yet a greater scale such as to form a floc which can subsequently be readily removed from the liquid.

Figure 5:
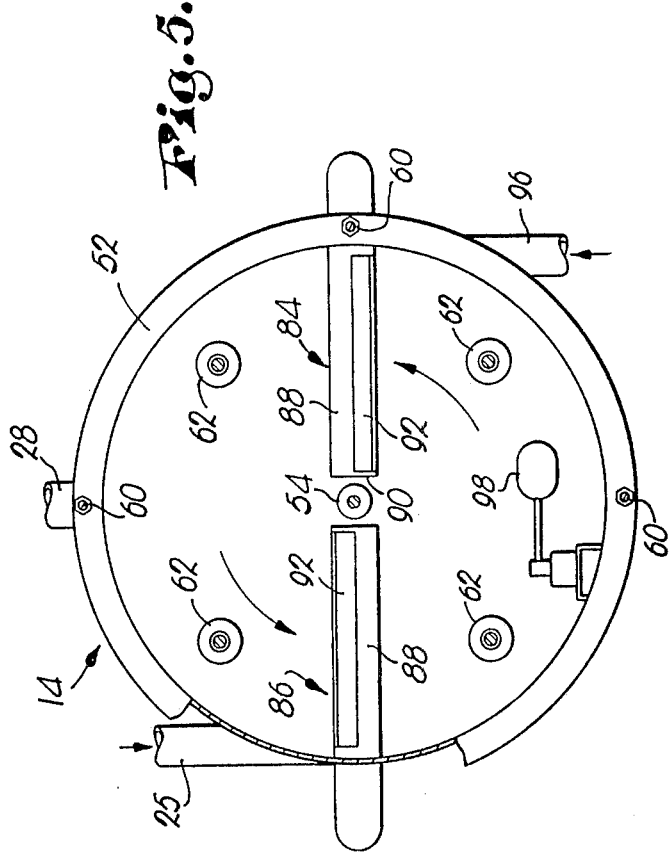
FIG. 5 is a horizontal, cross-sectional view thereof taken substantially along line 5—5 of FIG. 3.

It has been found that the suspension is best treated if introduced into the container 52 tangentially adjacent the bottom of the latter as illustrated in FIGS. 1 and 5. The suspension is, thus, swirled in a counterclockwise motion through the container 52, as viewed in FIG. 5, such that it is sequentially subjected to the force line groups 80 and 82. This repetitious application of a concentrated electrical force to the suspension is believed to further enhance the flocculating action which takes place within the treater 14.

As the solids are flocculated, they tend to rise to the surface of the suspension, primarily by virtue of the swirling action within the container 52. It has been found that by removing this layer of floc and reinserting it into the suspension at a low level in the container 52, the reintroduced floc provides a mass or "seed" to which other, smaller particles can become readily attached. Thus, the container 52 is provided with a pair of skimmers 84 and 86 disposed at the surface of the suspension within the container 52. Each skimmer 84, 86 includes a horizontal, radially extending tube 88 closed at its radially innermost end 90 and having a longitudinal inlet slot 92 oriented such as to receive the surface floc, such being denoted by the numeral 91 in FIGS. 3 and 6. Each tube 88 bends downwardly along the exterior of the container 52 where they intersect into a single line 93 controlled by a pump 94, as illustrated in FIG. 1. From the pump 94, the floc is reintroduced into the container 52 through a lower tangential inlet 96. Note, of course, that the slots 92 are arranged in the sides of the tubes 88 facing the counterclockwise flow of the floc, as illustrated in FIGS. 6 and 5.

As illustrated in FIG. 5, a suitable float 98 may be provided on the interior of the container 52 for the purpose of regulating the level of suspension within the container 52. The float 98 is electrically connected with the source of power (not illustrated) for the pump 24 so as to de-energize the latter when a predetermined liquid level is reached. Slightly below the desired liquid level is an outlet 100 in the container 52 communicating with the conduit 28. An additional outlet 102 in the funneled bottom of the container 52 communicates with the conduit 26 such that a pair of discharge pathways are provided for the flocculated suspension of the container 52.

From the conduits 26 and 28 the treated suspension enters the line 30 and is ultimately discharged into the clarifier 16, as illustrated in FIG. 1. The clarifier 16 includes a series of individual basins 104, each of which has upright sidewalls 106. The sidewalls 106 of all but the final basin 104 in the series are disposed such that the liquid will overflow by gravity into the next adjacent basin 104 in the series, and, similarly, all but the final basin 104 in the series is provided with an inclined floor 108. The floor 110 of the final basin 104 is simply horizontal, as illustrated.

As illustrated in FIG. 1, and in more detail in FIG. 7, each inclined floor 108 intersects the proximal wall 106 at the lowermost termination of the floor 108, at that intersection an outlet 112 being defined by a trough 114 which extends along the floor 108 for the entire width of the basin 104. Each arcuate trough 114 may be opened and closed by a similarly arcuate cover valve 116 which also extends the full width of the basin 104. The cover valve 116 is mounted on a suitable shaft 118 concentric with the trough 114 and the cover valve 116 for rotation between the solid and dotted line positions illustrated in FIG. 7. As illustrated, when in its solid line position, the cover valve 116 fully closes the trough 114, while in its rotated, dotted line position, the cover valve 116 fully opens the trough 114.

When the suspension arrives at the clarifier 16, it is treated as gently as possible and allowed to remain substantially at rest such that the floc will be encouraged to settle out onto the inclined floors 108. The sludge thus formed by the settled floc tends to slide down the floors 108 toward the troughs 114, and after a predetermined amount of such sludge has accumulated above the closed trough 114, the corresponding cover valve 116 may be rotated about the axis of shaft 118 by means not shown so as to open the trough 114 and allow the discharge of the sludge. Preferably, although not shown, it is to be understood that each trough 114 may be provided with a second valve downstream from the cover valve 116 which may be used to open the downstream end of the trough 114 when the cover valve 116 is closed, thereby permitting the trough 114 to be flushed using a high pressure jet of water.

The result of this construction is that the sludge accumulating within the basins 104 is very gently and yet positively handled. It has been found that, in most instances, the sludge is exceptionally easy to dissipate if manipulated to any appreciable extent. Thus, it becomes essential to handle the sludge very gently until finally and completely removed from the liquid. Encouraging the sludge to slide by gravity toward the outlets 112 is thus one way of contributing to its gentle handling. In addition, the rotatable valve covers 116 disturb the sludge only to the very slightest extent as they rock between their open and closed positions.

The clarified liquid from the first basin 104 in the series overflows into the second and subsequent basins until in the final basin, a satisfactorily clear liquid is obtained. Little or no sludge is obtained at this point, whereupon the clarified liquid may be drawn off through a lower outlet 120, as illustrated in FIG. 1.

In addition to the process as hereinabove described, it has been surprisingly found that two additional steps, when added to the overall procedure, encourage the suspended solids to flocculate and subsequently settle out in the desired manner. Firm explanations of exactly why the desired results are achieved are not known at this time, but it is nonetheless deemed desirable to explain their importance at this juncture.

Specifically, it has been found that sprinkling a small amount of clay particles into the treater 14 during operation (such as by a feeding auger not shown) has the effect of encouraging the solids in suspension to flocculate. In addition, settling out of the floc in the clarifier 16 has been found to be encouraged by spraying electrostatically treated water onto the suspension at that point. To this end, a spray head 122 in FIG. 1 may be coupled through a line 124 to the upper end of an electrostatic treater 126 (identical to the treater 12) which is, in turn, connected to a city water line through inlet 128.

The system as hereinabove described has been successfully utilized in a number of practical situations. For example, one of these systems was recently installed at a dairy processing plant to treat a suspension of dairy wastes instead of dumping the same directly into the community's sewage disposal installation. The suspension contained a number of hard-to-handle materials, such as whole milk, cream, butterfat, yogurt, soybean oil and even human fecal matter, and it was found that after passing the suspension through the entire system and removing the ultimate sludge in the manner as above-described, the clarified liquid which resulted was suitable for further processing in the sewage plant without fear of clogging carbon and sand filters utilized therein.

In one test run, the biological oxygen demand (B.O.D.) of a sample taken from the holding reservoir 10 measured 1075 milligrams per liter. A sample taken from the final clarifying basin 104 after substantial settling time (such as 8 hours) yielded a B.O.D. measurement of 112 milligrams per liter.

Other samples taken from the reservoir 10 and the final clarifying basin 104, respectively, yielded B.O.D. measurements of 1083 and 150 milligrams per liter; 1082 and 58 milligrams per liter; and 1119 and 60 milligrams per liter.

Having thus described the invention, what is claimed as new and desired to be secured by Letters Patent is:

1. In a method of treating a liquid suspension to remove suspended solids, the steps of:
    subjecting the suspension to an electrostatic field to initiate coagulation and flocculation;
    allowing the suspension to thereafter rest to settle out the flocculated solids; and
    between said subjecting and settling steps, exposing the suspension sequentially to groups of concentrated lines of force in an electrolytic treater whereby to intensify the coagulation and flocculation initiated by said electrostatic field.

2. In a method as claimed in claim 1; and the additional step of removing solid material from the surface of the suspension in the electrolytic treater and redirecting the same back into the suspension below said surface thereof.

3. In a method as claimed in claim 1, wherein said exposing step includes swirling the suspension through said groups of force lines.

4. In a method as claimed in claim 1, wherein said settling step includes collecting the settled solids on an inclined surface and sliding the solids down the surface toward a point of discharge.

5. In a method as claimed in claim 1; and the additional step of spraying the settling suspension with electrostatically treated water.

* * * * *